(12) United States Patent
DiViccaro

(10) Patent No.: US 6,290,440 B1
(45) Date of Patent: Sep. 18, 2001

(54) TIE DOWN STRAP CONTAINER

(76) Inventor: James DiViccaro, 3272 E. Simpson, Fresno, CA (US) 93703

( * ) Notice: Subject to any disclaimer, the term of this patent is extended or adjusted under 35 U.S.C. 154(b) by 0 days.

(21) Appl. No.: 09/584,410

(22) Filed: Jun. 5, 2000

(51) Int. Cl.[7] .................................................. B60P 7/08
(52) U.S. Cl. ........................................... 410/103; 410/101
(58) Field of Search .......................... 410/97, 101, 100, 410/103; 242/395, 532.6; 254/323; 24/265 CD, 68 CD

(56) References Cited

U.S. PATENT DOCUMENTS

| | | | |
|---|---|---|---|
| 3,377,044 | * 4/1968 | Jackson et al. ............... | 410/100 X |
| 4,842,458 | * 6/1989 | Carpenter .................... | 410/3 |
| 5,338,136 | * 8/1994 | Hetchler ...................... | 410/100 |
| 5,800,105 | * 9/1998 | Stump ......................... | 410/103 |
| 5,800,106 | * 9/1998 | Miller ......................... | 410/117 |
| 5,941,666 | * 8/1999 | Waters ........................ | 410/100 |
| 5,961,263 | * 10/1999 | Nunez ......................... | 410/103 |
| 5,993,127 | * 11/1999 | Shinn .......................... | 410/100 |
| 6,109,846 | * 8/2000 | Davis et al. .................. | 410/100 |
| 6,139,233 | * 10/2000 | Wilsey ........................ | 410/100 |

* cited by examiner

*Primary Examiner*—Stephen T. Gordon
(74) *Attorney, Agent, or Firm*—Carol D. Titus; James J. Leary

(57) ABSTRACT

A container for storing a tie down strap having a tray with a well and winding spindle is disclosed. The strap is fed through a slit in the side of the well to engage the winding spindle. A handle is attached to the spindle to allow the user to wind the strap into the container. A lid is pivotally attached to the tray by a hinge pin. The lid is secured in place by an indentation in the lid engaging a post on the tray. To further secure the container in a closed position, a hook may be placed through a pair of apertures: one in the tray and one in the lid. The hook may be attached to the wall of a truck bed for easy storage.

12 Claims, 5 Drawing Sheets

TIE DOWN STRAP CONTAINER

BACKGROUND OF THE INVENTION

This invention relates generally to the field of containers, and more particularly to tie down strap container.

Strap type tie downs are known. They are frequently used to secure items within the bed of a pickup truck or the like. The tie down consists of a strap, usually made of woven nylon, a pair of steel S hooks and a retaining buckle that causes the strap to tighten down on the object or objects being held in place. The S hooks are designed to interact with tie down wells located on the side panels of most truck beds. Tie down straps usually are sold packaged in a simple paper and plastic disposable container. Once the strap is out of the packaging and in use, the storage of the strap becomes problematic.

The straps end up in a tangled mess, sliding around on the floor of the truck bed. They become dirty, knotted and can be lost or damaged by other items sliding over them.

SUMMARY OF THE INVENTION

The primary object of the invention is to provide a container for a tie down strap and related hooks that keeps the strap neat and clean.

Another object of the invention is to provide a tie down strap container that can be hung and stored on the inside wall of a pickup truck or the like.

Another object of the invention is to provide a tie down strap container that incorporates a wind up mechanism to wind the strap into the container.

Other objects and advantages of the present invention will become apparent from the following descriptions, taken in connection with the accompanying drawings, wherein, by way of illustration and example, an embodiment of the present invention is disclosed.

Tie down Strap Container comprising: a strap retaining tray, a winding spindle and associated winding handle, a tray lid, a lid pivot means, a lid retaining means, and a hanging hook to secure said tie down container to the side wall of a vehicle or the like.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
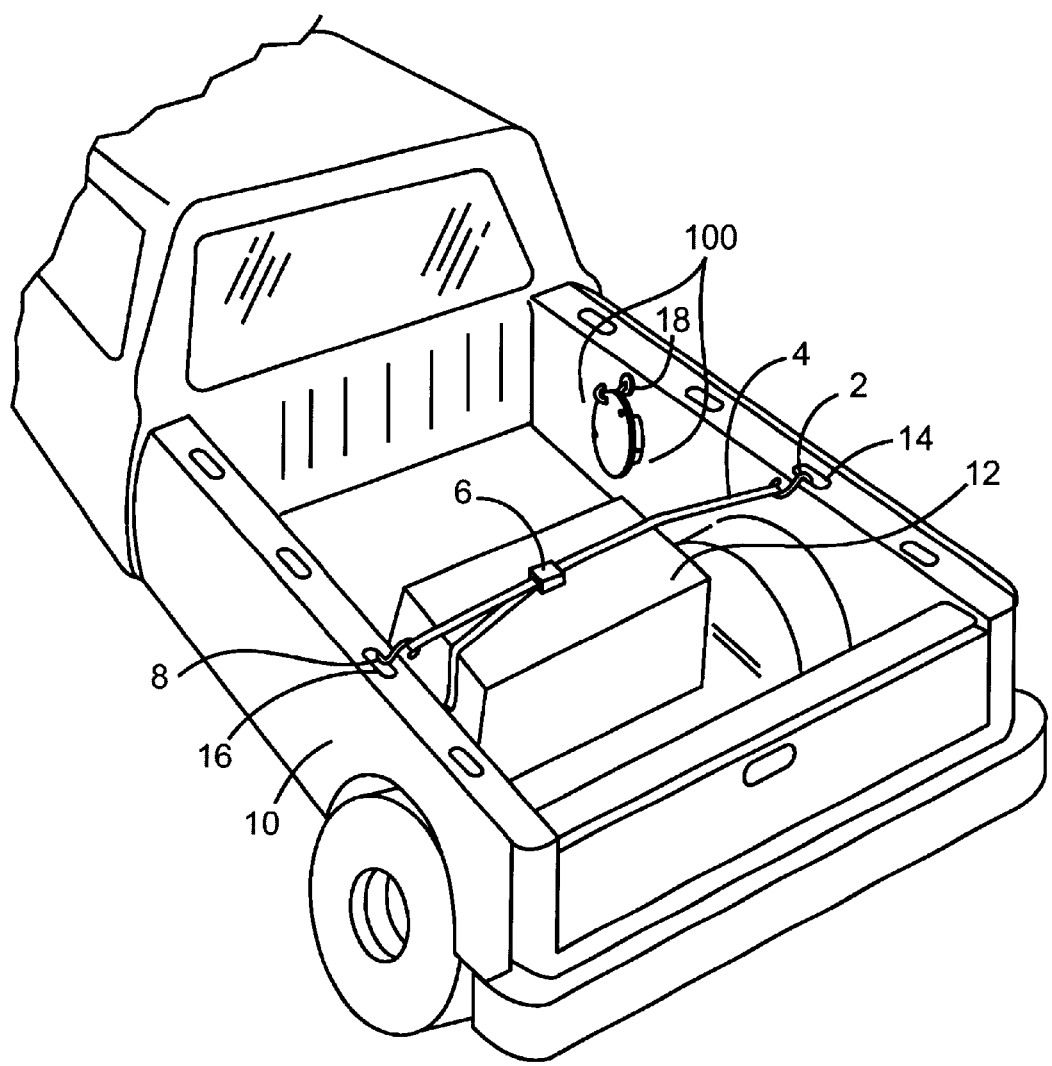
FIG. 1 is a perspective view of the tie down strap container in the storage mode
Figure 2:
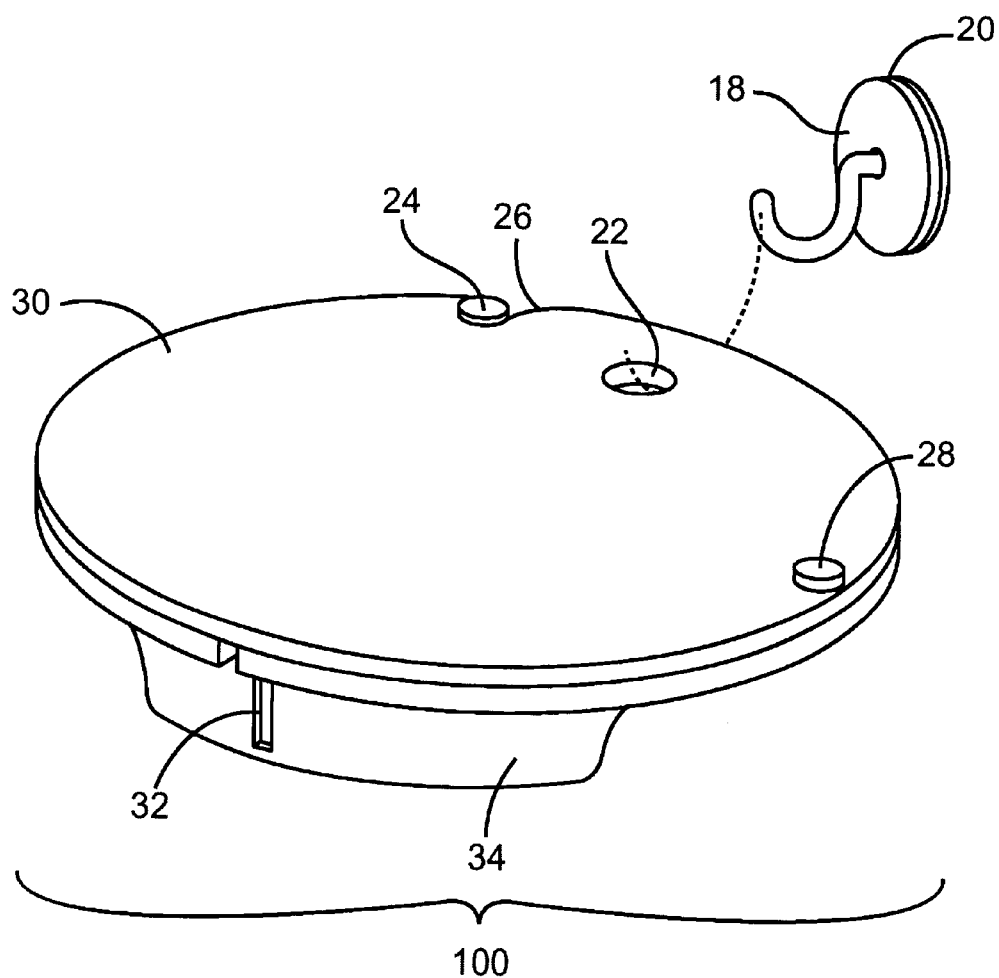
FIG. 2 is a perspective view of the tie down strap container in its closed position.
Figure 3:
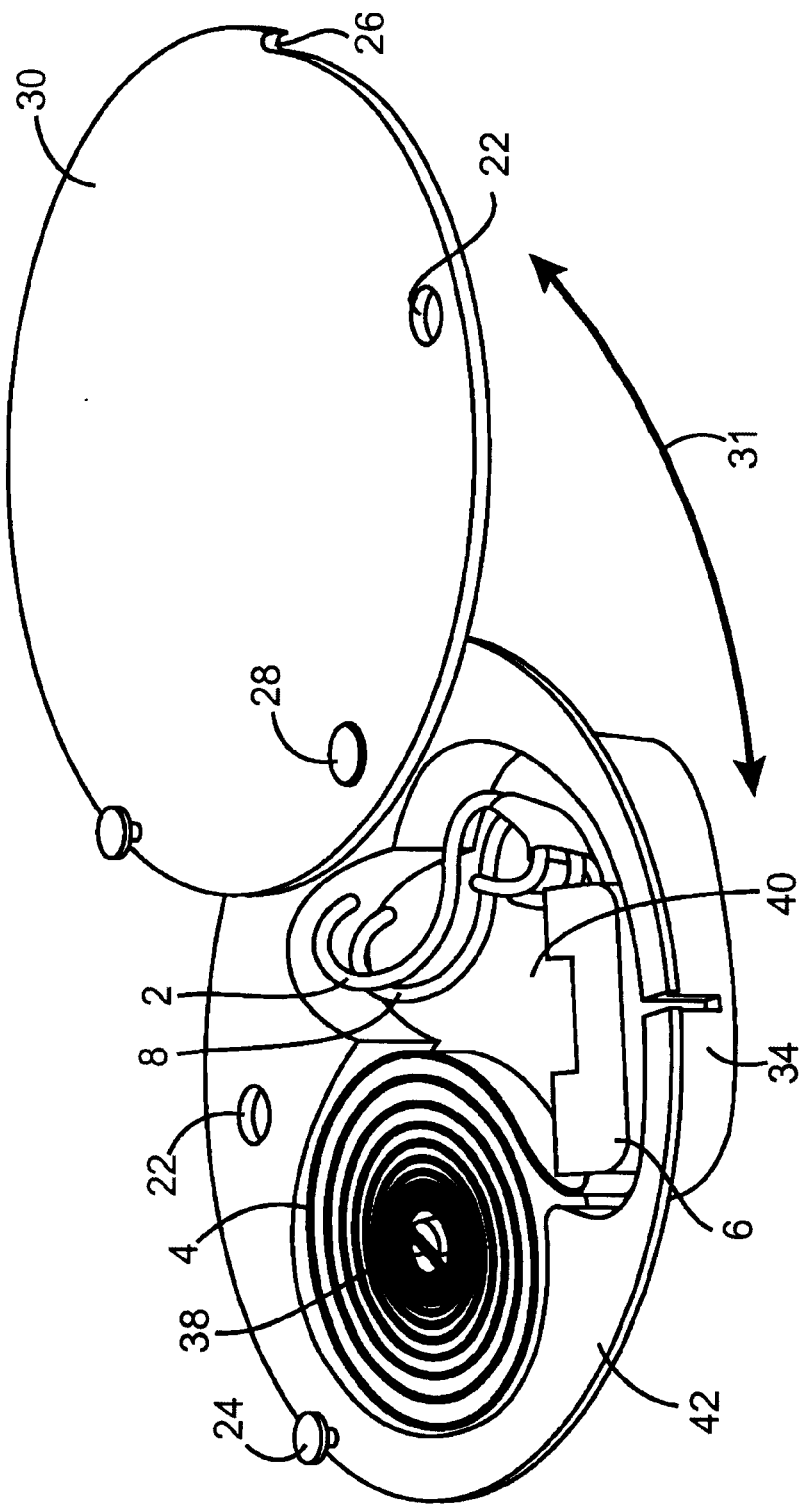
FIG. 3 is a perspective view of the tie down strap container in its open position.
Figure 4:
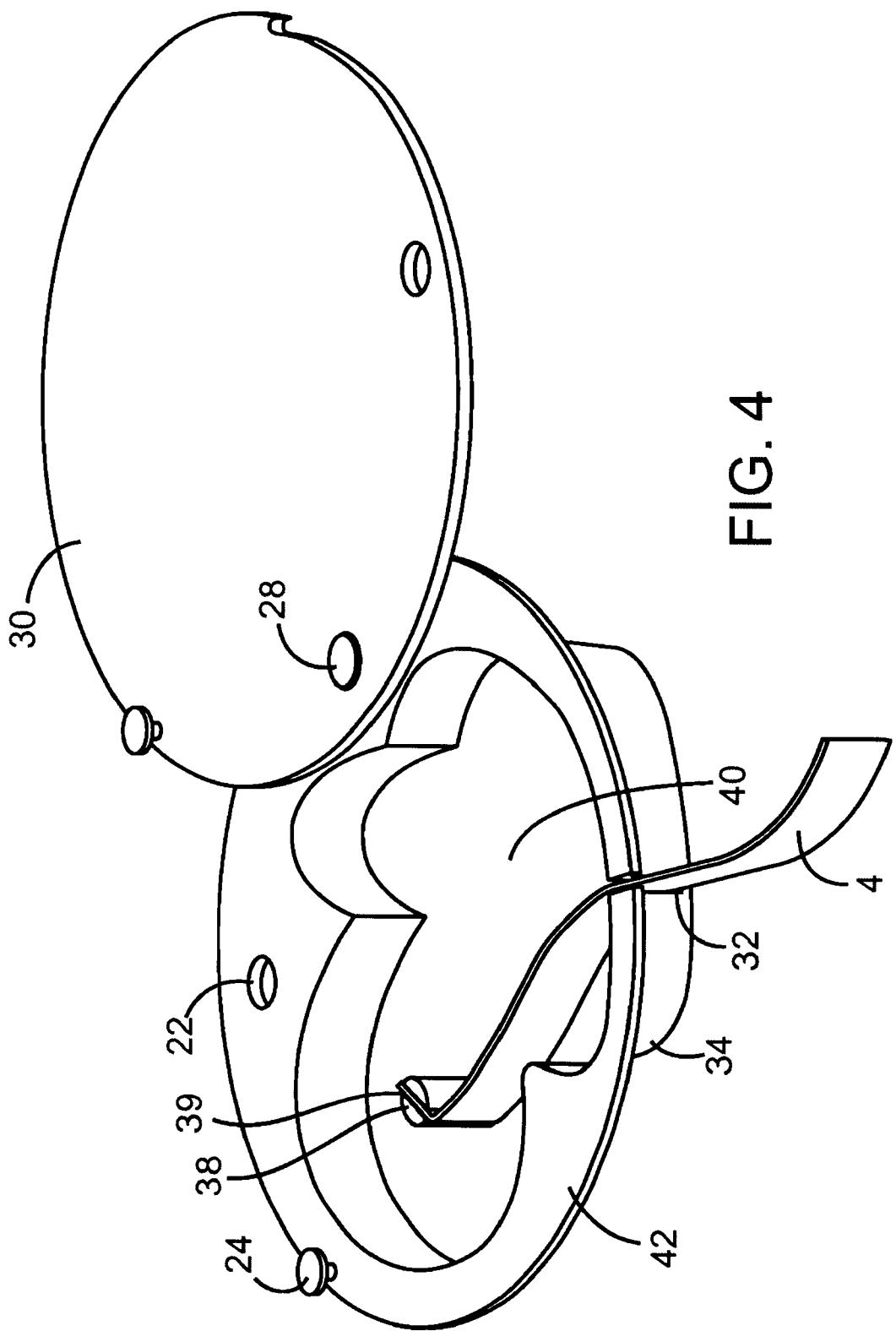
FIG. 4 is a perspective view of the underside strap container showing the strap winder.
Figure 5:
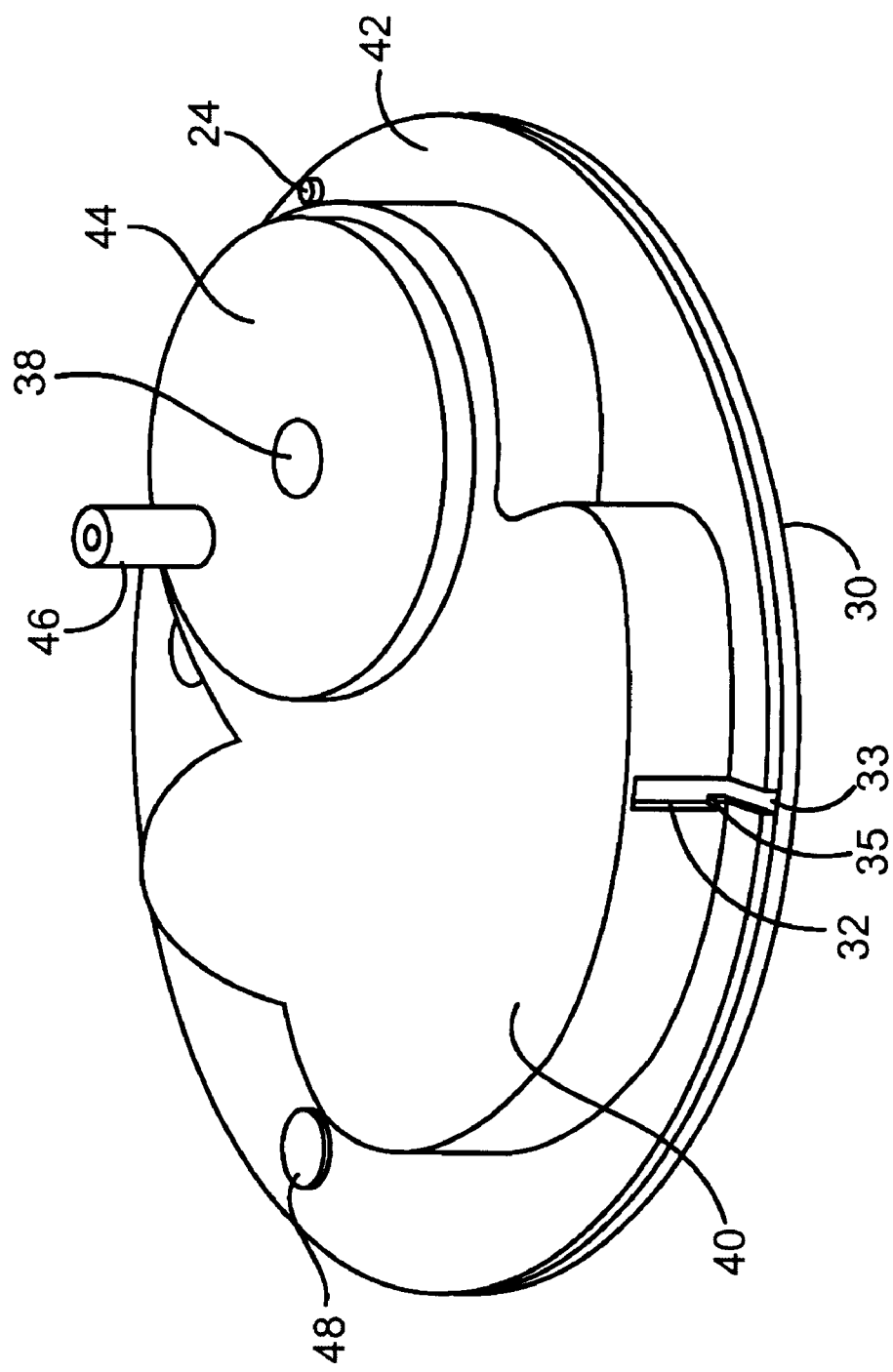
FIG. 5 is a perspective view of the strap being wound into the strap container.

Referring now to FIG. 1, we see a perspective view of a truck bed 10 having the tie down container 100 of the present invention attached to the side wall of the truck by hook 18. When stored, the tie down strap is protected from dirt and other mishaps that occur when the strap is simply left on the floor of the truck bed. FIG. 1 also shows the tie down strap 4 in use. S hooks 2, 8 insert into wells 14, 16 and the strap is cinched tight by ratchet buckle 6, thereby holding box 12 in a secure manner. This is a common use of a typical tie down strap. FIG. 2 is a perspective view of the tie down strap container of the present invention 100 in the closed position. Also shown is hook 18 that can be adhered to the side of a truck bed by adhesive material 20. Hook 18 interacts with aperture 22 and allows the container 100 to be hung as well as insuring the closure of lid 30 with respect to tray 34 since the aperture 22 exists in both lid 30 and tray 34. Lid 30 swings open by pivoting about hinge pin 28. Lid 34 is secured in a closed position with the lid 34 over the top surface 42 of the tray 34 when the indented portion 26 of lid 30 interacts frictionally with retaining post 24. FIG. 3 shows the present invention 100 with lid 30 swung in the open position 31, revealing the contents which include strap 4, S hooks 2, 8 and ratchet buckle 6. Strap 4 is wound about winding post 38. The entire contents fit within well 40 of tray 34. FIG. 4 shows how the user threads the strap 4 through slit 32 in the side wall of tray 34 and then slides the strap 4 through slit 39 in winding spindle 38. The user then winds the spindle 38 by rotating winding knob 46 shown in FIG. 5, thereby causing winding disk 44 to rotate and thereby causing spindle shaft 38 to rotate and take in strap 4. FIG. 5 also shows that slit 32 narrows at point 33 so that when strap 4 is inserted and wound, it tends to be held from coming out of slit 32 by retaining ledge 35.

In the above described and illustrated way, the tie down container of the present invention helps keep a tie down strap neat and clean and can be easily wound into said container, and also helps hold the strap in a convenient location such as the side wall of a pickup truck bed.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A tie down strap container, comprising:
   a strap retaining tray,
   a winding spindle located within the strap retaining tray,
   a winding handle connected with the winding spindle,
   a tray lid sized and configured to cover the strap retaining tray,
   and a lid pivot pivotally connecting the tray lid to the strap retaining tray.

2. The tie down strap container of claim 1, further comprising a lid retaining means for holding the lid closed over the strap retaining tray.

3. The tie down strap container of claim 1, further comprising a hanging hook sized and configured to extend though an aperture in the tray lid and the strap retaining tray, thereby securing the lid in a closed position over the strap retaining tray.

4. The tie down strap container of claim 3, further comprising an adhesive material located on a back surface of the hanging hook.

5. The tie down strap container of claim 1, wherein the strap retaining tray has side wall having a slit extending therethrough, the slit sized and configured to allow a strap to pass therethrough.

6. A tie down strap container, comprising:
   a strap retaining tray having a well,
   a winding spindle located within the well,
   a winding handle connected with the winding spindle,
   a slit extending through the strap retaining tray and into the well,
   a tray lid pivotally connected to the strap retaining tray by a hinge pin, the tray lid sized and configured to cover the well,
   and a hanging hook sized and configured to hold the tie down strap container.

7. The tie down strap container of claim 6, further comprising a retaining ledge narrowing the slit proximate a top surface of the strap retaining tray.

8. The tie down strap container of claim 6, wherein the winding handle extends outside the strap retaining tray.

9. The tie down strap container of claim 6, further comprising a retaining post extending up from the strap retaining tray and wherein, said tray lid has an indented portion sized and configured to engage the retaining post.

10. The tie down strap container of claim 6, further comprising a first aperture extending through the strap retaining tray and into the well and a second aperture extending through the tray lid, the hanging hook being sized and configured to extend through said first and second apertures.

11. The tie down strap container of claim 6, wherein said hinge pin is generally perpendicular to a surface of the tray lid.

12. A tie down strap container, comprising:
   a strap retaining tray having a first aperture extending therethrough and a well adapted to hold at least one tie down strap,
   a winding spindle located within the well, the winding spindle having a slit adapted to receive at least one layer of the tie down strap,
   a winding spindle connected with the winding spindle and extending outside the strap retaining tray from a bottom surface of the well,
   a slit extending through the strap retaining tray and into the well,
   a retaining ledge narrowing the slit proximate a top surface of the strap retaining tray,
   a retaining post extending up from the strap retaining tray,
   a tray lid pivotally connected to the strap retaining tray by a hinge pin, the hinge pin being generally perpendicular to the tray lid, the tray lid having a second aperture extending therethrough and an indented portion sized and configured to engage the retaining post, the tray lid sized and configured to cover the strap retaining tray,
   a hanging hook sized and configured to extend through said first and second apertures, thereby securing the lid in a closed position over the strap retaining tray.

* * * * *